No. 858,685. PATENTED JULY 2, 1907.
R. E. VAN DUSER & J. O. E. KROHN.
ELEVATING ROAD GRADING MACHINE.
APPLICATION FILED MAY 7, 1906.
6 SHEETS—SHEET 1.

No. 858,685. PATENTED JULY 2, 1907.

R. E. VAN DUSER & J. O. E. KROHN.
ELEVATING ROAD GRADING MACHINE.
APPLICATION FILED MAY 7, 1906.

No. 858,685. PATENTED JULY 2, 1907.
R. E. VAN DUSER & J. O. E. KROHN.
ELEVATING ROAD GRADING MACHINE.
APPLICATION FILED MAY 7, 1906.

No. 858,685. PATENTED JULY 2, 1907.
R. E. VAN DUSER & J. O. E. KROHN.
ELEVATING ROAD GRADING MACHINE.
APPLICATION FILED MAY 7, 1906.

UNITED STATES PATENT OFFICE.

ROBERT E. VAN DUSER AND JOHN O. E. KROHN, OF CHICAGO, ILLINOIS, ASSIGNORS, BY DIRECT AND MESNE ASSIGNMENTS, TO JESSE H. CHAMBERLAIN, OF MINNEAPOLIS, MINNESOTA.

ELEVATING ROAD-GRADING MACHINE.

No. 858,685.  Specification of Letters Patent.  Patented July 2, 1907.

Application filed May 7, 1906. Serial No. 315,578.

*To all whom it may concern:*

Be it known that we, ROBERT E. VAN DUSER and JOHN O. E. KROHN, both citizens of the United States, and residing at Chicago, Cook county, Illinois, have invented certain new and useful Improvements in an Elevating Road-Grading Machine, of which the following is a clear, full, and exact description.

Our invention relates to an elevating road grading machine, and its object, aside from possessing all of the usual advantages of a machine of this character, is to make the draft of the plow independent of the frame of the body of the machine, so as to relieve the body of that strain, and to have absolute control of the plow either for the purpose of increasing the depth of the furrow, or to obtain the desired obliquity of the plowshare to the line of draft, and a further object is to provide a conveyer, which will be actuated by the motion of the machine, through the medium of a sprocket and chain, and to absolutely control the incline of the conveyer to enable it either to deliver the soil to the central portion of the road, or dump the soil into wagons running alongside, and is also to provide a conveyer which, when the machine is traveling through a comparatively narrow space, can be bent or folded upwards so that it will take up less roadway. This we accomplish by the means hereinafter fully described and as particularly pointed out in the claims.

In the drawings:
Fig. 3 is a rear end elevation of the machine.
Fig. 9 is a transverse section of the same taken on dotted line $x$, $x$, Fig. 8.

Figure 1:
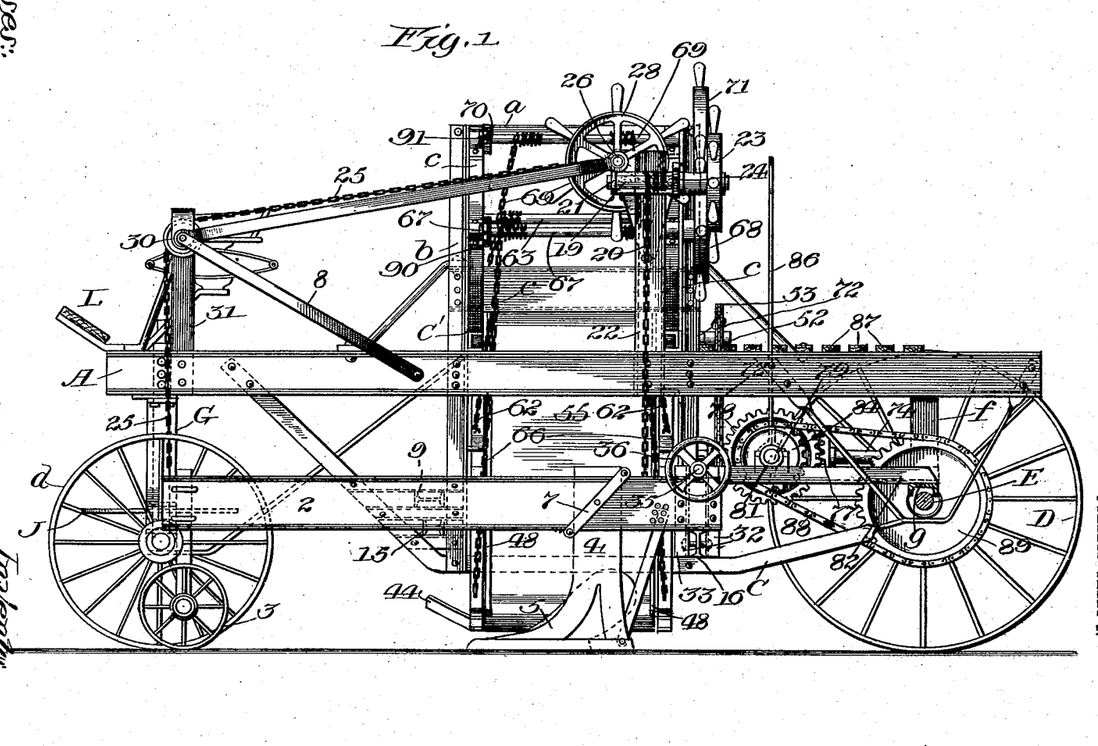
—Figure 1 is a side elevation of my improved machine showing the nigh rear wheel removed so as to disclose the actuating mechanism of the conveyer.
Figure 2:
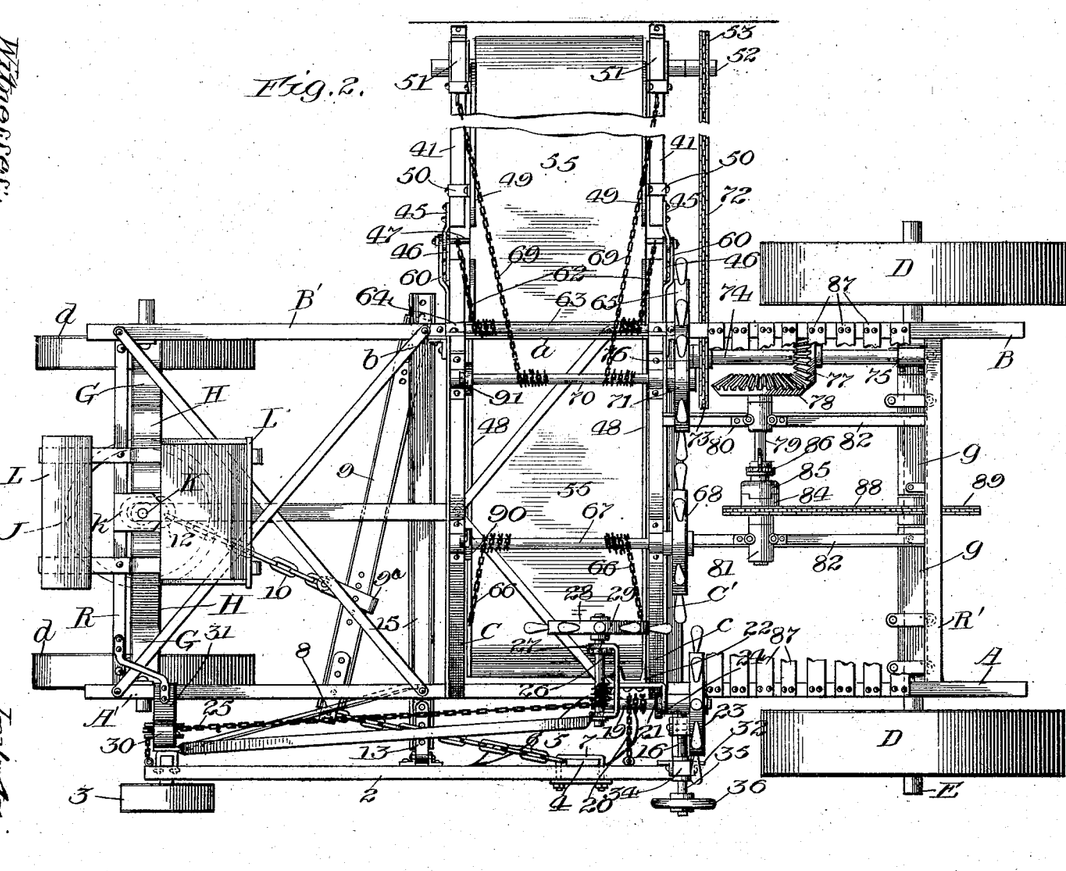
Fig. 2 is a plan view showing the platform broken away to reveal the actuating mechanism of the conveyer.
Figure 4:
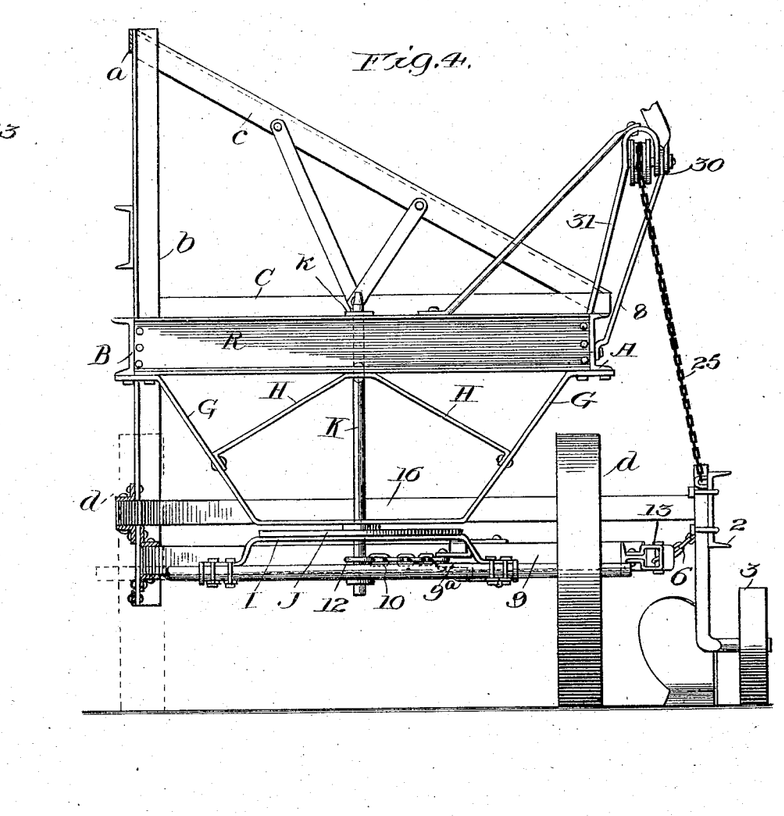
Fig. 4 is a front elevation of the machine with the conveyer, and windlasses and other parts used in connection with said conveyer and plow omitted.
Figure 5:
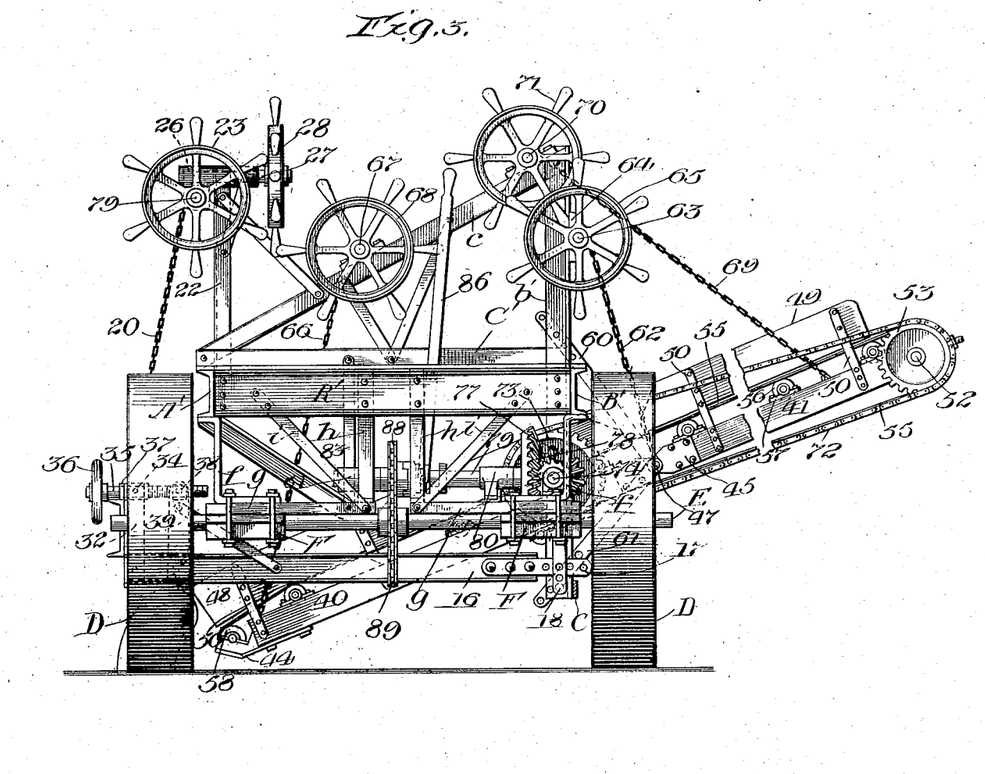
Figs. 5 and 6 are view of details of the machine.
Figure 6:
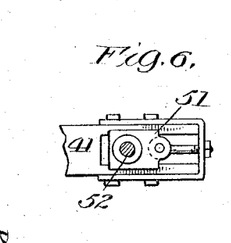
Figure 7:
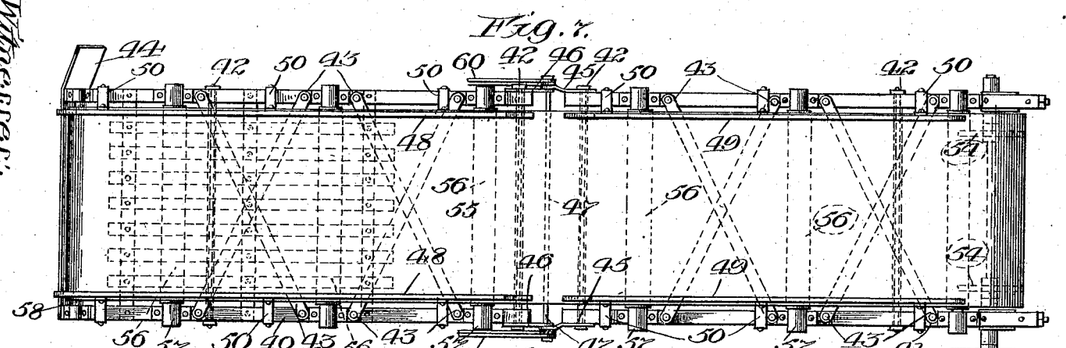
Fig. 7 is a plan view of the conveyer removed from the machine.
Figure 8:
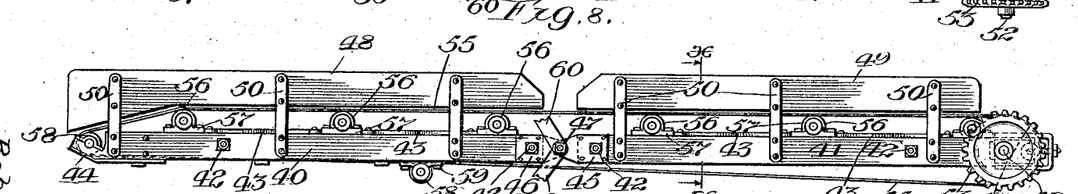
Fig. 8 is a side view thereof.
Figure 9:
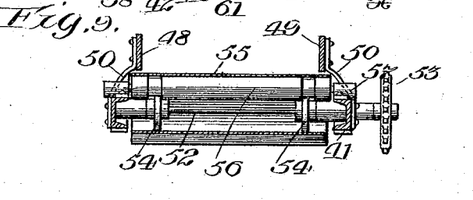
Figure 10:
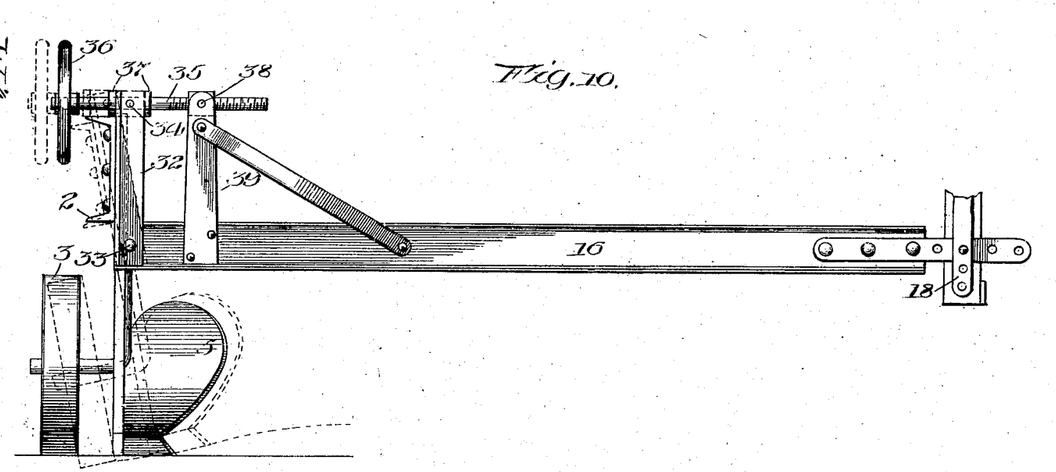
Fig. 10 is a detail view showing a rear elevation of the tilting mechanism of the plow removed from the machine.
Figure 11:
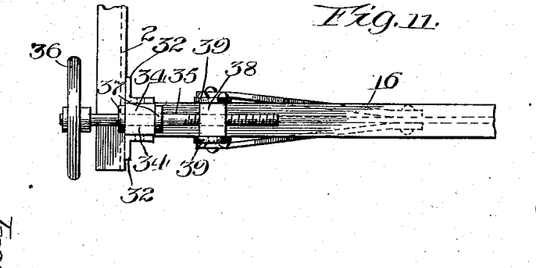
Fig. 11 is a plan view of the same.
Figure 12:
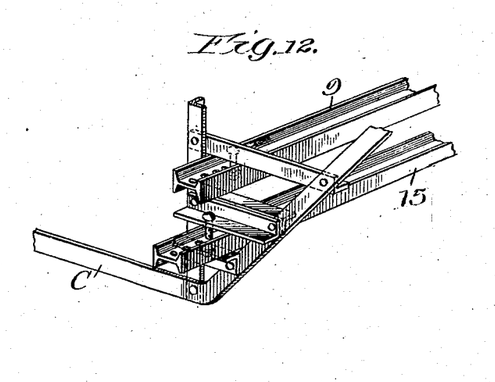
Fig. 12 is a perspective view of a portion of the adjustable end of the draft equalizing device of the plow.

Referring to the drawings it will be noticed that the framework of the body of the machine is constructed principally of rolled metal beams of commercial form. The body frame comprises a continuous side-sill A, extending from end to end of the machine on the left hand side, and a divided side-sill on the right hand side. The right hand side-sill consists of two sections of channel-beam, the front section B' of which extends from the forward end of the machine to near the central portion thereof, and the rear alining section B, of which extends from the rear of the machine to about the same distance from the center of the same as said front section. The adjacent ends of these sections B' and B are respectively connected to the metal uprights $b$ and $b'$, of an open rectangular framework which latter extends quite a distance above and below the plane of the side-sills and have their upper ends connected by a suitable plate $a$. The lower ends of these uprights $b$, $b'$ extend below the plane of the axis of the front wheels and are connected by the horizontal stretch of a tension bar C, the forward upwardly inclined end of which latter is connected to the forward portion of section B' of the right hand side-sill, and the rear end of which passes under the rear axle and then extends upwards and has its end secured to the end of the rear section B of said side-sill. The forward ends of the side-sills are connected by a metal end-sill R and the rear ends of said sill are connected by a suitable rear end-sill R'. The upper ends of the uprights $b$ are reinforced by transverse braces $c$, $c$, which extend therefrom in a downwardly inclined direction to a point preferably immediately above the side-sill A, where their lower ends are secured to the transverse sill C' which extends and has its opposite end secured to the uprights $b$ just above the plane of sections B' and B of the right hand side-sill. This body-frame of the machine is supported by two forward wheels $d$ and two rear wheels D, which latter are greater in diameter than the former.

The axle E of the rear wheels is secured fast on the hubs thereof in any suitable manner and revolves therewith, and it is journaled in suitable bearings F. These bearings are supported by and secured to the divided rear bolster, each division of which comprises a Z-shaped stanchion $f$ whose upper shorter horizontal portion is secured to the lower edge of the side-sills, and whose lower longer horizontal portion is bolted or clipped to the upper side of an inverted transverse channel-beam $g$, into which the upper portion of the bearings of axle E is fitted. The clips that secure the stanchion $f$ to the channel-beam $g$ also hold the bearings F to said channel-beam. The said channel-beams just referred to extend from each side to near the center of width of the machine, and their inner ends are connected to the overhead end-sill R' by vertical hangers and inclined braces, $h$, $h$, and $i$, $i$, respectively.

The front of the body-frame of the machine is supported by an upper bolster G consisting of a flat bar of metal the central portion of which is horizontal and the ends of which incline upwards and outwards towards the side-sills and are bolted or otherwise secured to the end-sill R. This bolster is reinforced by an inverted V-shaped brace H, whose central portion is secured to the center of length of the front end sill R, and whose ends are suitably secured to the outwardly inclined end portions of the bolster. Secured to the front axle by means of suitable clips is an inverted bow-shaped lower bolster I, which supports and sustains the fifth wheel J of the running gear. The front wheels are loose on the spindles of the front axle, which latter is pivotally connected to the body-frame of the machine by a king-bolt K, extending up through the center of length of the said axle, through the lower bolster and the upper bolster, and has its upper end pass up through a bracket k secured to and projecting rearwardly from the center of length of the front end-sill. A seat and a foot-rest L of suitable construction are secured in any desired manner to the front end-sill, but we make no particular claim to novelty in so far as this feature is concerned.

The plow used in connection with my improved machine comprises a suitable metal beam 2, which is arranged substantially parallel to and below the plane of the continuous left hand side-sill of the body-frame and has its front end supported by a suitable vertically adjustable caster-wheel 3, and its rear end supported by the standard 4 of the plowshare 5, substantially as shown in the drawings. The draft for this plow is provided by means of a chain 6, whose rear end is attached to the clip 7 that secures the standard 4 to the beam, and whose forward end is attached in a suitable manner to a clevis 8 on the adjacent end of a transversely disposed equalizing bar 9, whose opposite end is pivoted between suitable lugs secured to and projecting from the portion of the forwardmost upright b of the open rectangular frame in about the same horizontal plane as the plow-beam 2. This equalizing-bar is connected by a suitable clevis $9^a$ and tug chain 10 to a large link 12, which surrounds and has longitudinal play independent of the king-bolt K above the axle of the machine. The plow-beam is connected by a suitably swiveled coupling 13 to the adjacent ends of transversely adjustable horizontal beams 15 and 16, the former of which is located in about the transverse plane intersecting the center of length of said beam 2, and the latter of which is arranged in the transverse plane of the rear end thereof. The distance which the plow-beam 2 is removed from the longitudinal plane of the side-sill A, is determined by the adjustment of the transverse beams 15 and 16, which adjustment is accomplished by means of the perforated extension bar 17, secured to and extending longitudinally from the ends of said beams, farthest from the plow, and a perforated strap 18 secured to the lower end of the vertical members b, b' of the open rectangular frame of the machine body, to which they are respectively connected by suitable pins. The rear end of plow-beam 2 can be elevated by means of a windlass 19 and chain 20. The axis of this windlass is, preferably, disposed in a longitudinal direction, and its bearings are journaled in the parallel ends of the U-shaped metal frame 21 secured near the upper end of a vertical post 22, which latter is secured to and arises from the continuous left hand side-sill of the machine body. The rear end of this windlass extends through its bearings and is provided with a hand-wheel 23, the involuntary reverse motion of which is prevented so as to enable the rear end of the plow-beam 2 to be held in any elevated position desired, by a pawl and ratchet 24. The front end of the plow-beam can be raised or lowered by a chain 25 and a windlass 26, which latter is journaled in bearings in the parallel ends of the U-shaped frame 27 secured to the post 22, preferably at right angles to and above the plane of frame 21 of the windlass 19. The inner end of this last mentioned windlass is also extended through its bearings, and provided with a hand-wheel 28, and with a pawl and ratchet 29, as shown, to prevent the unwinding of the windlass, except as desired. The axis of the windlass 26 is, preferably, in a transverse plane, and the chain 25 extends forward therefrom to and over a sheave 30 journaled in the goose-neck shaped upper end of a standard 31, which latter is secured to and arises from the forward portion of the left hand continuous side-sill of the machine, from whence said chain extends downwards and is connected to a suitable eye projecting inwards from the forward end of the plow-beam.

The end of the transverse beam 16, adjacent to the rear end of the plow-beam, is connected thereto by means of two vertical parallel angle-irons 32, 32, which are riveted to the inner side of the rear end of the plow-beam, and have their lower ends extend below said plow-beam and pass on each side of the adjacent end of the beam 16 to which they are pivotally connected by a pivotal bolt 33. These angle-irons extend slightly above the upper edge of the plow beam and have a boss 34 placed between and pivotally connected to their upper ends. A transverse screw 35, which has a hand wheel 36 on its outer end, is passed through this boss 34, and has collars 37 secured thereto on each side of the boss to prevent longitudinal motion therethrough. This screw extends transversely towards the center of the machine and has the remainder thereof screw-threaded and passed through the nut 38, which latter has diametrically opposite trunnions having bearings in the uprights 39, whose lower ends are rigidly and immovably connected to the transverse beam 16, as shown.

By manipulating screw 35 so as to turn it in one direction the rear end of the plow-beam will be tilted so as to incline towards the machine, and by turning the screw in the opposite direction said plow-beam can be made to re-assume a perpendicular position or can be tilted to incline away from the machine. This tilting enables the operator of the machine to adjust the cutting edge of the plowshare to grade the roadway at just the angle desired.

The soil thrown up by the plowshare, as the machine moves forward, is thrown over onto the lower end of a transversely arranged conveyer, which is sustained below and extends transversely from a point near the plowshare, through the open rectangular frame interposed intermediate the ends of the right hand side-sill, and projects a suitable distance beyond the right hand side of the machine. By sufficiently elevating the projected end of the conveyer, it can be made to discharge into a wagon moving alongside of the machine, or can be made to deliver the soil nearer the central portion of the road, for which latter purpose the conveyer is sustained at such an angle that the projected end thereof is generally lowered. This conveyer consists of two sections 40 and 41, each consisting of a pair of side-rails arranged parallel to each other, and held a sufficient distance apart by tie-bolts 42 and crossed stay-bars 43. The end of the section nearest the plowshare has the ends of its rails connected by a shield 44, which latter consists of a plank of metal or wood the end of which nearest the front of the machine is bent upwards. The office of this shield is to prevent the dirt from entering the bearings of the roller journaled in said ends. The adjacent ends of the side-rails of each section are provided with plates 45 and 46, that extend beyond said ends and are connected by a pivotal bolt 47 passed transversely through them. I prefer to make these sections correspond in length, and to provide each with guide-boards 48 and 49, respectively, which are secured edgewise to the side-rails of each section by suitable brackets 50, substantially as shown. At the outer end of the projected section 41 of the conveyer, the side-rails are provided with longitudinally adjustable bearings 51 for a transverse shaft 52, the end of which nearest the rear of the machine passes through its bearings and has a sprocket wheel 53 secured thereto. Between its bearings this shaft 52 is provided with several disks 54, around which an endless apron 55 is passed, that extends to and around the roller 44 at the end of section 40 nearest the plowshare. The upper stretch of this apron is supported in its travel from the end of the conveyer nearest the plowshare to the farthest end of the projected section 41, by several rollers 56, whose bearings 57 are secured to the upper edge of the side-rails of both sections. The lower stretch of this endless apron is prevented from sagging particularly at the lower end of section 40, by passing over the roller 58 whose bearings are secured to the underside of said section 40, about as shown. The guide-boards 48, 49, are adapted to prevent the soil from falling off the side edges of the apron.

The center of length of the conveyer, or the point where the two sections are pivotally connected together, is held out away from the machine, and maintained at a given point outside of the vertical plane of the right hand side-sill by adjustable brackets, each of which consist of two links, 60 and 61, the ends of which forming the outer apex of the triangle described by which, being pivotally connected to the extended ends of pivotal bolt 47, and the opposite ends of which are each provided with a longitudinal series of openings, and are secured to the uprights $b$, $b'$, of the open rectangular frame, by means of bolts or rivets passed through any one of said openings so as to obtain the projection of the outer apices of the brackets according as desired. The conveyer is also supported at about its center of length by chains 62 the lower ends of which are suitably connected to said bolt 47, and the upper portions of which are wound around a windlass 63, that has its bearings 64 secured at a suitable point near the upper ends of the uprights, $b'$ $b'$ of the open rectangular frame, and has its rear end extend through its bearings and provided with a hand wheel 65 with which to turn it. This windlass is also provided with a suitable ratchet and pawl mechanism 96 which prevents the accidental unwinding thereof. The end of section 40 of the conveyer nearest the plowshare is sustained by chains 66, whose lower ends are suitably attached to the side-rails of said section and whose upper portion is wound around a windlass 67, the bearings of which are secured to the inclined braces $c$, $c$. The rear end of this windlass extends through its bearings, and is provided with a hand wheel 68, and is also provided with a suitable ratchet and pawl mechanism 90 for preventing its involuntary unwinding. The outer projected end of section 41 is sustained by chains 69, the lower ends of which are suitably secured to the side-rails of said section, the upper ends of which are wound upon a windlass 70, journaled in bearings secured to and supported by the braces $c$, $c$, and the rear end of which extends beyond its bearings and is provided with a hand wheel 71, and is prevented from involuntarily unwinding by a suitable ratchet and pawl mechanism 91, the same as the other windlasses hereinbefore described.

The endless apron of the conveyer is actuated by means of a chain 72, which engages the sprocket wheel 53 on the end of shaft 52, and connects the same with a sprocket wheel 73, secured to a longitudinally disposed shaft 74 arranged parallel to and below the rear section of the right hand sill of the machine. The end of this shaft is suitably journaled in bearings 75 secured to the adjacent stanchion $f$ under the rear end of the machine, and its front end is journaled in bearings 76 secured to the rear vertical upright $b'$ of the rectangular open frame thereof. Shaft 74 is driven through the medium of miter gears 77 and 78, the latter of which is secured to the end of a transverse shaft 79, whose bearings, 80 and 81, are secured to and supported by the channel beam $g$ at the rear end, and by hangers 82 depending from the transverse sill $C'$ at its forward end. Between its bearings shaft 79 is provided with a sprocket 84, which is loosely mounted thereon and has its boss so constructed as to provide a counterpart for the clutch 85, which latter has a limited longitudinal movement upon shaft 79, but revolves therewith. This clutch is thrown in and out of engagement, according as desired, to impart the motion of the sprocket 84 to shaft 79, by a lever 86, which lever extends up through the slatted platform 87, built upon and connecting the upper edges of the rear portions of the left hand and right hand side-sills of the body-frame, and is fulcrumed to a pivotal lug secured to one of said slats as shown or in any other suitable manner.

The operator stands upon the platform 87 and is within convenient reach of the windlasses 19, 26, 67, 70 and 63, so as to control the operation of both the plow and the conveyer, which have been hereinbefore fully explained. The sprocket 84 is driven through the medium of a chain 88 and drive sprocket 89, mounted upon and secured to the rear axle E of the machine, which revolves as the machine moves and, owing to the weight of the machine, possesses sufficient power to impart its motion, through the gearing hereinbefore explained, to the conveyer.

What we claim as new is:—

1. An elevating road grading machine comprising a rectangular body-frame having a portion of one of its side-sills displaced between its ends, and a rectangular frame substituted for said displaced portion.

2. An elevating road grading machine comprising a rectangular body-frame having a portion of one of its side-sills displaced between its ends and a vertical rectangular frame substituted for said displaced portion and extending both above and below said side-sill.

3. An elevating road grading machine comprising a rectangular body-frame having a portion of one of its side-sills displaced between its ends, and a vertical rectangular frame substituted for said displaced portion and extending both above and below said side-sill and a tension bar the ends of which are connected to the opposite ends of the forward and rear sections of said side-sills, and which is connected to the lower portion of said rectangular frame below said sill.

4. An elevating road grading machine comprising a rectangular body-frame having a portion of one of its side-sills displaced between its ends, and a rectangular frame substituted for said displaced portion and transversely inclined braces connecting the upper portion of the rectangular frame above the said side-sill to the opposite side of the body-frame.

5. An elevating road grading machine comprising a rectangular body-frame having a portion of one of its side-sills displaced, a rectangular open frame substituted for said displaced portion, and extending both above and below said sill, a longitudinally disposed tension bar the ends of which are connected to the opposite ends of the forward and rear sections of said sill, and to the lower portion of said rectangular frame mediate its ends, and transversely inclined braces connecting the upper part of the rectangular frame above the sill to the opposite side of the body-frame.

6. An elevating road grading machine comprising a rectangular body-frame having a portion of one of its side-sills displaced between its ends, a vertically disposed rectangular frame substituted for said displaced portion, a suitable plow, and a transverse conveyer suspended below and between the planes of the vertical members of said rectangular frame.

7. An elevating road grading machine comprising a rectangular body-frame having a portion of one of its side-sills displaced between its ends, a vertically disposed rectangular frame substituted for said displaced portion, a suitable plow, and a transverse conveyer adjustably suspended at its ends and at a suitable point between the same below and between the planes of the vertical members of said rectangular frame.

8. In a machine of the kind specified, a suitable body-frame having a portion of one of its side-sills displaced between its ends, a vertically disposed rectangular frame substituted for said displaced portion, a plow, a transverse conveyer, means connected to the end of said conveyer and suspending the same between the transverse planes of the vertical members of said rectangular frame, and brackets consisting of links to the connected ends of which said conveyer is pivoted mediate its ends and which have their opposite ends adjustably secured to the vertical members of said rectangular frame.

9. In a machine of the kind specified, a suitable frame having a portion of one of its side-sills displaced between its ends and a vertically disposed rectangular frame substituted for said displaced portion, a plow, a transverse conveyer consisting of two sections the adjacent ends of which are pivoted together, means for adjustably suspending the ends of said conveyer, and brackets consisting of links to the adjacent connected ends of which the pivot of the sections of said conveyer is connected and which have their opposite ends adjustably connected to the vertical members of said rectangular frame.

10. In a machine of the kind specified, a suitable body-frame, running gear therefor, a plow, and draft rigging for the same which extends above the front axle and is independent of the body-frame and axle.

11. In a machine of the kind specified, a suitable body-frame, running gear therefor, a plow, and draft rigging for the same consisting of a tug-chain, a transversely disposed equalizing bar arranged under the body-frame to which said tug-chain is connected mediate its ends, and a chain connecting said plow to said equalizing bar.

12. In a machine of the kind specified, a suitable body-frame, running gear therefor, a plow, and draft rigging for the same consisting of a tug-chain the forward end of which passes over the front axle independent of the body-frame, a transversely disposed equalizing bar arranged under the body-frame and having said tug-chain connected thereto mediate its ends, and a chain connecting said plow to said equalizing bar.

13. In a machine of the kind specified, a suitable body-frame, front wheels and axle and rear wheels and axle supporting the same, and a king-bolt for said front axle, a draft chain through one of the links of which said king bolt passes above the front axle, and means connecting said chain to said plow.

14. In a machine of the kind specified, a suitable body-frame, a plow, an equalized draft which is independent of said body-frame and means connected with said body-frame for tilting the plow laterally.

15. In a machine of the kind specified, a suitable body-frame, and a plow, an equalized draft which is independent of said body-frame and laterally adjustable means connecting said plow to said body-frame and adjustably tilting the same.

16. In a machine of the kind specified, a suitable body-frame, a plow, a draft-equalizing bar, a transverse beam supported by said body-frame, means rigidly secured to the rear portion of the plow for pivotally connecting the same in a horizontal plane to said transverse beam, and devices for adjusting the said means to tilt said plow laterally.

17. In a machine of the kind specified, a suitable body-frame, a plow consisting of a plow-share, standard and beam, a transverse beam supported by said body-frame, vertically disposed irons rigidly secured to said plow-beam and having their lower ends pivoted to said transverse-beam, and a transverse screw engaging the upper ends of said irons for tilting said plow laterally.

18. In a machine of the kind specified, a suitable body-frame, a plow consisting of a plow-share, standard and beam, a transverse beam supported by said body-frame, a vertically disposed upright rigidly secured to said transverse beam near said plow, vertically disposed irons rigidly secured to said plow beam and having their lower ends pivoted to said transverse beam, a pivot nut pivotally secured in the upper end of said upright, and a transverse screw engaging the upper ends of said irons and said nut for tilting said plow laterally.

19. In a machine of the kind specified, a suitable body-frame, a plow, a draft equalizing bar therefor, laterally adjustable means for connecting the plow at about the center of length of the beam thereof, and at the rear end of said beam to the body-frame, and devices connected with said rear laterally adjustable means for tilting said plow laterally.

20. In a machine of the kind specified, a suitable body-frame, a plow, a draft equalizing bar therefor, a transversely adjustable beam connecting the beam of said plow at about its center of length to the body-frame, and an adjustable transverse beam supported by said body frame, means rigidly secured to the rear portion of the plow for pivotally connecting the same in a horizontal plane to said transverse beam, and devices for adjusting the said means to tilt said plow laterally.

21. In a machine of the kind specified, a suitable body-frame, a plow consisting of a plow-share, standard and beam, a transversely adjustable beam connecting the center of length of said beam to the body-frame and an adjustable transverse beam supported by said body-frame, vertically disposed irons rigidly secured to said plow-beam and having their lower ends pivoted to said transverse beam, and a transverse screw engaging the upper ends of said irons for tilting said plow laterally.

22. In a machine of the kind specified, a suitable body-frame, a plow consisting of a plow-share, standard and beam, a transversely adjustable beam connecting the center of length of said beam to the body-frame, and an adjustable transverse beam supported by said body-frame, a vertically disposed upright rigidly secured to said transverse beam near said plow, vertically disposed irons rigidly secured to said plow beam and having their lower ends pivoted to said transverse beam, a pivot nut pivotally secured in the upper end of said upright, and a transverse screw engaging the upper ends of said irons and said nut for tilting said plow laterally.

23. In a machine of the kind specified, a suitable body-frame, a plow draft rigging, which is independent of said body-frame, a draft equalizing bar, a transverse beam supported by said body-frame, means rigidly secured to the rear portion of the plow for pivotally connecting the same in a horizontal plane to said transverse beam, and devices for adjusting the said means to tilt said plow laterally.

24. In a machine of the kind specified, a suitable body-frame, a plow consisting of a plow-share, standard and beam, the draft of which is independent of said body-frame, a transverse beam supported by said body-frame, vertically disposed irons rigidly secured to said plow-beam and having their lower ends pivoted to said transverse beam, and a transverse screw engaging the upper ends of said irons for tilting said plow laterally.

25. In a machine of the kind specified, a suitable body-frame, a plow consisting of a plow-share, standard and beam, the draft of which is independent of said body-frame, a transverse beam supported by said body-frame, a vertically disposed upright rigidly secured to said transverse beam near said plow, vertically disposed irons rigidly secured to said plow beam and having their lower ends pivoted to said transverse beam, a pivot nut pivotally secured in the upper end of said upright, and a transverse screw engaging the upper ends of said irons and said nut for tilting said plow laterally.

26. In a machine of the kind specified, a suitable body-frame, a plow draft rigging which is independent of said body-frame, a draft equalizing bar therefor laterally adjustable means for connecting the plow at about the center of length of the beam thereof, and at the rear end of said beam to the body-frame, and devices connected with said rear laterally adjustable means for lifting said plow laterally.

27. In a machine of the kind specified, a suitable body-frame, a plow consisting of a plow-share, standard and beam the draft of which is independent of said body-frame, a transversely adjustable beam connecting the center of length of said beam to the body-frame and an adjustable transverse beam supported by said body-frame, vertically disposed irons rigidly secured to said plow-beam and having their lower ends pivoted to said transverse beam, and a transverse screw engaging the upper ends of said irons for tilting said plow laterally.

28. In a machine of the kind specified a suitable body-frame, running gear therefor, a plow, draft rigging for the same, a windlass and chain for regulating the elevation of the forward end of the plow beam and an independent windlass and chain for regulating the elevation of the rear end of said plow beam, and transversely adjustable means connecting the center of length and the rear end of said plow beam to said body-frame.

29. In a machine of the kind specified, a suitable body-frame, running gear therefor, a plow, draft rigging for the same, a windlass and chain for regulating the elevation of the forward end of the plow beam, an independent windlass and chain for regulating the elevation of the rear end of said plow beam, transversely adjustable means connecting the center of length and the rear end of said plow-beam to said body-frame, devices connected with said rear laterally adjustable means for tilting said plow, a transversely disposed conveyer consisting of two sections jointed together and suitable gearing driven by the rear axle of said running gear for actuating the conveyer.

30. In a machine of the kind specified, a suitable body-frame, front wheels, and axle and rear wheels and axle supporting the same, a king-bolt for said front axle, a draft-chain independent of the body-frame through one of the links of which said king-bolt passes above the front axle, an equalizing-bar to which said draft chain is secured, a plow, and a chain independent of said draft-chain for connecting said plow to said equalizing bar.

In testimony whereof I have hereunto set my hand this 7th day of April 1906.

ROBERT E. VAN DUSER.

Witnesses:
D. H. CHAMBERLAIN,
H. O. MARSTAD.

In testimony whereof I have hereunto set my hand this 29th day of March, 1906.

JOHN O. E. KROHN.

Witnesses:
FRANK D. THOMASON,
E. K. LUNDY.